United States Patent
Blackie et al.

(10) Patent No.: US 9,500,120 B2
(45) Date of Patent: Nov. 22, 2016

(54) INTEGRATION RING

(75) Inventors: Michael John Blackie, South Lyon, MI (US); Ross Thomas Sawyers, Taylor, MI (US); Michael Schmidt, Howell, MI (US)

(73) Assignee: Flexible Metal, Inc., Tucker, GA (US)

( * ) Notice: Subject to any disclaimer, the term of this patent is extended or adjusted under 35 U.S.C. 154(b) by 593 days.

(21) Appl. No.: 13/420,137

(22) Filed: Mar. 14, 2012

(65) Prior Publication Data

US 2012/0235407 A1    Sep. 20, 2012

Related U.S. Application Data

(60) Provisional application No. 61/452,373, filed on Mar. 14, 2011.

(51) Int. Cl.
| F02B 37/02 | (2006.01) |
| F01N 13/10 | (2010.01) |
| F01N 13/14 | (2010.01) |
| F01N 13/18 | (2010.01) |

(52) U.S. Cl.
CPC ............ *F02B 37/02* (2013.01); *F01N 13/102* (2013.01); *F01N 13/143* (2013.01); *F01N 13/1811* (2013.01); *F01N 13/1827* (2013.01); *F01N 2340/06* (2013.01); *F01N 2530/26* (2013.01); *Y02T 10/144* (2013.01); *Y10T 16/05* (2015.01)

(58) Field of Classification Search
CPC ............ F01N 13/143; F01N 13/1811; F01N 13/1827; F01N 13/102; F01N 2340/06; F01N 2530/26; F02B 37/02; F16L 36/00; F16L 36/005
USPC ........................................ 285/223, 224, 331
See application file for complete search history.

(56) References Cited

U.S. PATENT DOCUMENTS

| 1,021,264 | A | * | 3/1912 | Reusher | 285/331 |
| 3,473,833 | A | * | 10/1969 | Bremer | 285/285.1 |
| 4,263,780 | A | * | 4/1981 | Stettler | 60/39.23 |
| 4,475,341 | A | * | 10/1984 | Inoue et al. | 60/605.1 |
| 6,494,501 | B2 | * | 12/2002 | Gotoh | 285/371 |
| 7,234,302 | B2 | | 6/2007 | Korner | |
| 8,172,274 | B2 | * | 5/2012 | More et al. | 285/233 |

FOREIGN PATENT DOCUMENTS

EP    1541826    3/2007

* cited by examiner

*Primary Examiner* — David E Sosnowski
*Assistant Examiner* — James Linford
(74) *Attorney, Agent, or Firm* — Varnum, Riddering, Schmidt & Howlett LLP

(57) ABSTRACT

An integration ring is configured to interconnect two components, such as an exhaust manifold and a turbine housing. The integration ring may include an outer wall and an inner wall spaced apart from one another. A spacer may be positioned between the inner wall and outer wall. A first and second pocket may be formed between the inner and outer walls.

4 Claims, 6 Drawing Sheets

INTEGRATION RING

CROSS-REFERENCE TO RELATED APPLICATION

This application claims the benefit of U.S. Provisional Patent Application No. 61/452,373, entitled "Integration Ring," filed on Mar. 14, 2011, which is hereby incorporated in its entirety by reference.

FIELD OF INVENTION

The present invention generally relates to exhaust manifolds and turbine housings, and more particularly, to a method and apparatus for integrating an exhaust manifold and housing.

BACKGROUND

Many modern high performance engines generate extremely hot exhaust gas emissions. As these emissions are expelled from the engine and pass through the exhaust manifold, the hot emissions heat the exhaust manifold or pipes to increasingly high temperatures. Such high temperatures cause the temperature of the components in the manifold, i.e. stampings, to elevate resulting in thermal expansion and discoloration of the components.

To account for the effects of high-temperature gas emissions, some manifold designs employ a dual wall construction that utilizes an air gap between inner and outer components. In some instances the air gap may be created using spacers or may be designed with a first wall and second wall spaced apart from one another. The resulting air gap between the walls insulates the outer wall from the inner wall thereby reducing heat transfer to the outer wall. As a result, expansion, discoloration and excessive heating at the outer wall are minimized.

In engines having a turbocharger, the manifold is commonly connected to a turbine housing. The turbine housing may utilize the engine's exhaust to spin a turbine, which in turn spins an air pump to compress air. The compressed air is pumped into the cylinders during combustion. The turbine housing typically includes an inlet for receiving the engine's exhaust.

Some manifold/turbine housing configurations utilize a unitary body, meaning a single formed piece comprising the manifold and turbine housing. Commonly, however, the manifold and housing are separate parts. Designs that utilize a separate housing and manifold allow for replacement of system components as well as individual material choices for each component of the system. Such designs, however, may require a coupling between the manifold and the turbine housing.

Like the manifold, portions of the turbine housing may include a dual wall configuration. For example, the housing may include a dual wall portion having an air gap at or near its inlet. Therefore, the coupling between the manifold and turbine housing must account for the dual wall geometries of both the manifold and the housing.

Traditional manifold to housing couplings suffer from several deficiencies. For example, as described above, heat from the engine may cause the inner walls of the manifold and turbine housing to expand. The manifold to housing coupling must be designed to account for and permit such thermal expansion. At the same time, the coupling must minimize any obstruction to air flow. Traditional designs fail to adequately account for thermal expansion while also maximizing smooth airflow through the system.

Therefore, an improved manifold to turbine housing connection is needed.

SUMMARY

An integration ring is generally provided. The integration ring may include an inner wall and an outer wall spaced apart from the inner wall. A spacer may be positioned between the inner wall and outer wall to form a first pocket and a second pocket between the inner wall and the outer wall. The pockets may be configured to receive a portion of a component, such as an exhaust manifold or a turbine housing. The pocket may be sized to allow for thermal expansion of the component therein.

In an embodiment, the inner wall may be tapered, such as a tapered inner surface of the inner wall. The tapered surface may funnel air flow through the integration ring.

BRIEF DESCRIPTION OF THE DRAWINGS

Objects and advantages together with the operation of the invention may be better understood by reference to the detailed description taken in connection with the following illustrations, wherein.

DETAILED DESCRIPTION

Figure 1:
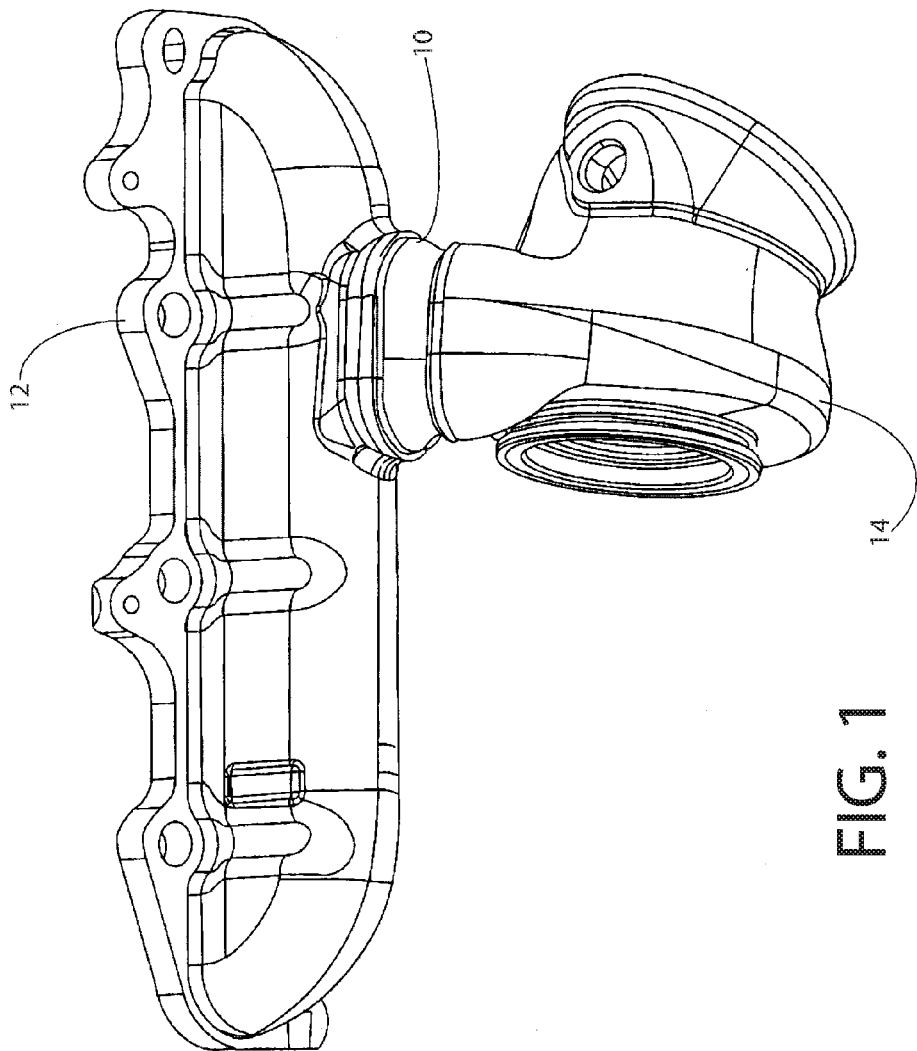
FIG. 1 illustrates an outer wall view of an exhaust manifold and turbine housing connected by an integration ring.
Figure 2:
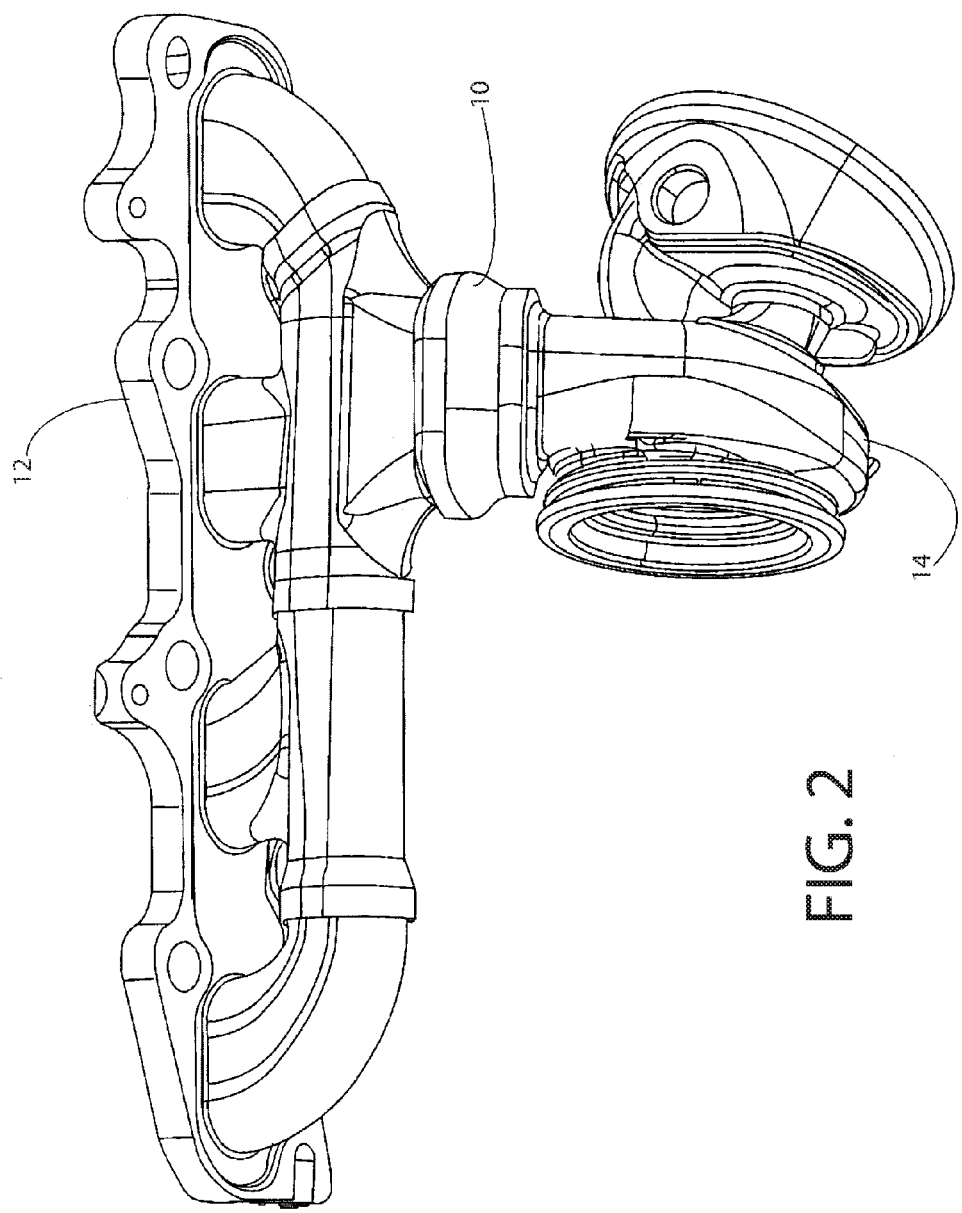
FIG. 2 illustrates an inner wall view of an exhaust manifold and turbine housing connected by an integration ring.
Figure 3:
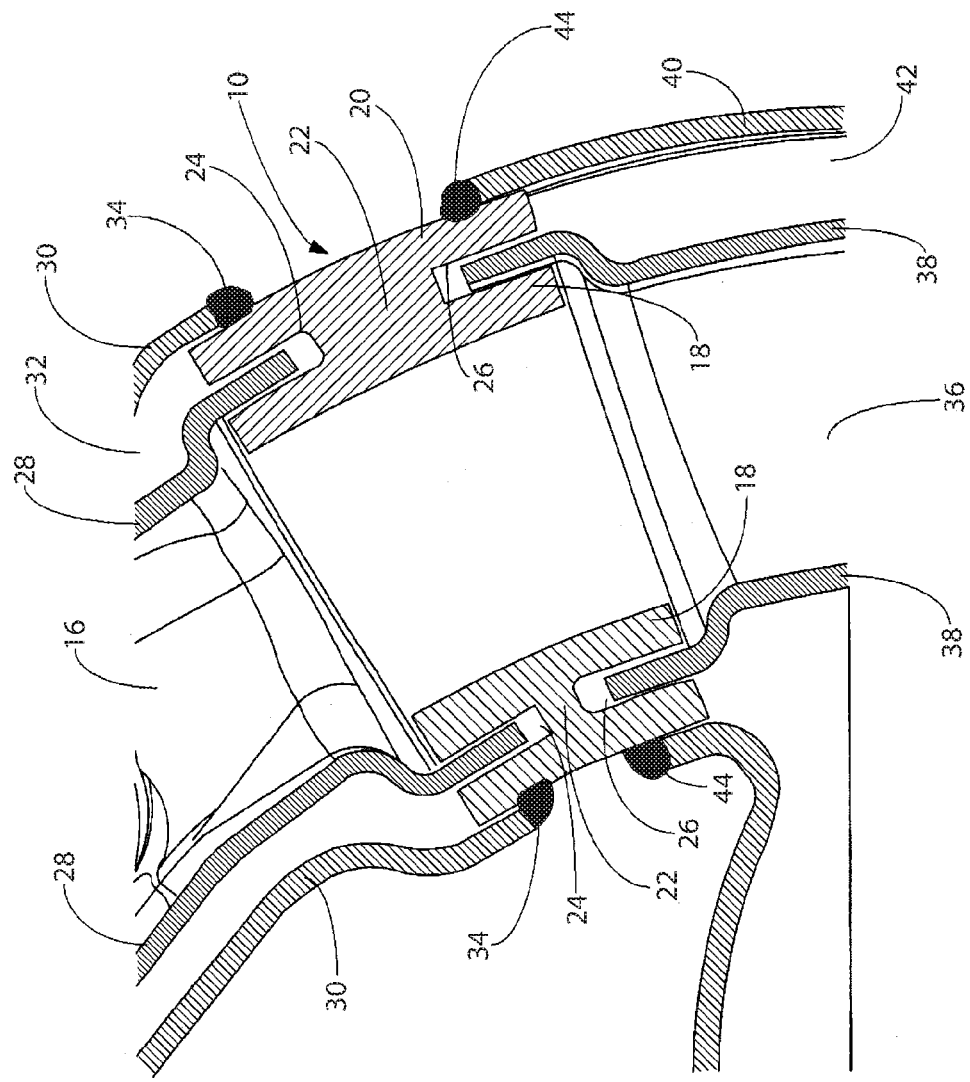
FIG. 3 illustrates a cutaway view of an integration ring connecting an exhaust manifold and turbine housing.

Reference will now be made in detail to exemplary embodiments of the present invention, examples of which are illustrated in the accompanying drawings. It is to be understood that other embodiments may be utilized, and structural and functional changes may be made, without departing from the respective scope of the present invention.

An exhaust manifold integration ring is presented, as shown in FIGS. 1-4. The integration ring 10 is configured to couple an exhaust manifold 12 to a second component, such as a turbine housing 14. It will be appreciated, however, that the integration ring 10 may be used to couple the manifold 12 to any component, or alternatively may be used to couple any other two or more components together.

The integration ring 10 may be any appropriate size and shape. For example, the integration ring 10 may be sized to engage a portion of the exhaust manifold 12 and may be generally tubular to interconnect two similarly shaped tubular sections. The integration ring 10 may be composed of any appropriate material, such as cast iron.

The integration ring 10 may be sized and shaped to engage an outlet port 16 in the exhaust manifold 12. The cross-sectional shape of the integration ring 10 may be circular, square, or any appropriate shape to match the cross-sectional shape of the outlet port 16.

The integration ring 10 may comprise an inner wall 18 and an outer wall 20. The inner wall 18 and outer wall 20 may be spaced apart to form an opening therebetween. In an embodiment, the integration ring 10 may include a spacer 22 to interconnect the inner and outer walls 18, 20. The spacer 22 may divide the opening to form a first pocket 24 and a second pocket 26. The first and second pockets 24, 26 may have any appropriate cross-sectional size and shape, such as a rectangular cross-section, and may be arranged in any appropriate alignment, such as parallel to or linearly aligned with one another.

The integration ring 10 may be sized and shaped to allow the first pocket 24 to receive a portion of the outlet port 16, such as an inner wall 28. The opening or first pocket 24 provides a slip fit between the integration ring 10 and the outlet port 16. In other words, the outlet port may move freely with respect to the integration ring 10. The slip fit may include sufficient clearances to allow for thermal expansion of the outlet port inner wall 28 within the pocket 24.

In an embodiment, the manifold 12 may be a dual wall manifold comprising the inner wall 28, an outer wall 30, and an air gap 32 therebetween. As described above, the inner wall 28 may be positioned within the opening between the inner and outer walls 18, 20 of the integration ring 10 in a slip fit arrangement. The outer wall 30 may be positioned about a portion of the outer wall 20. Due to the insulation provided by the air gap 32, the temperatures experienced at the outer wall 30 may be lower than the temperature at the inner wall 28. Accordingly, the outer wall 30 may experience minimal or no thermal expansion. Therefore, the outer wall 30 may be directly connected to the outer wall 20. For example, the outer wall 30 may be welded to the outer wall 20 at a contact point 34. It will be appreciated, however, that the outer wall 30 may be connected to the outer wall 20 by any means known in the art.

The integration ring 10 may engage a second component, such as a turbine housing 14, as illustrated in FIGS. 1-4. For example, the second pocket 26 may be configured to receive a portion of the turbine housing 14, such as an inlet port 36. The second pocket 26 provides a slip fit between the integration ring 10 and the inlet port 36. The slip fit may include sufficient clearances to allow for thermal expansion of the inlet port 36 within the second pocket 26.

In an embodiment, the inlet port 36 may have a dual wall configuration comprising an inner wall 38, an outer wall 40, and an air gap 42 therebetween. The inner wall 38 may be positioned within the second pocket 26 in a slip fit arrangement, as described above. The outer wall 40 may be positioned about a portion of the outer wall 20. The outer wall 40 may be directly connected to the outer wall 20, such as welded to the outer wall 20 at a contact point 44. It will be appreciated, however, that the outer wall 40 may be connected to the outer wall 20 by any means known in the art.

Figure 4:
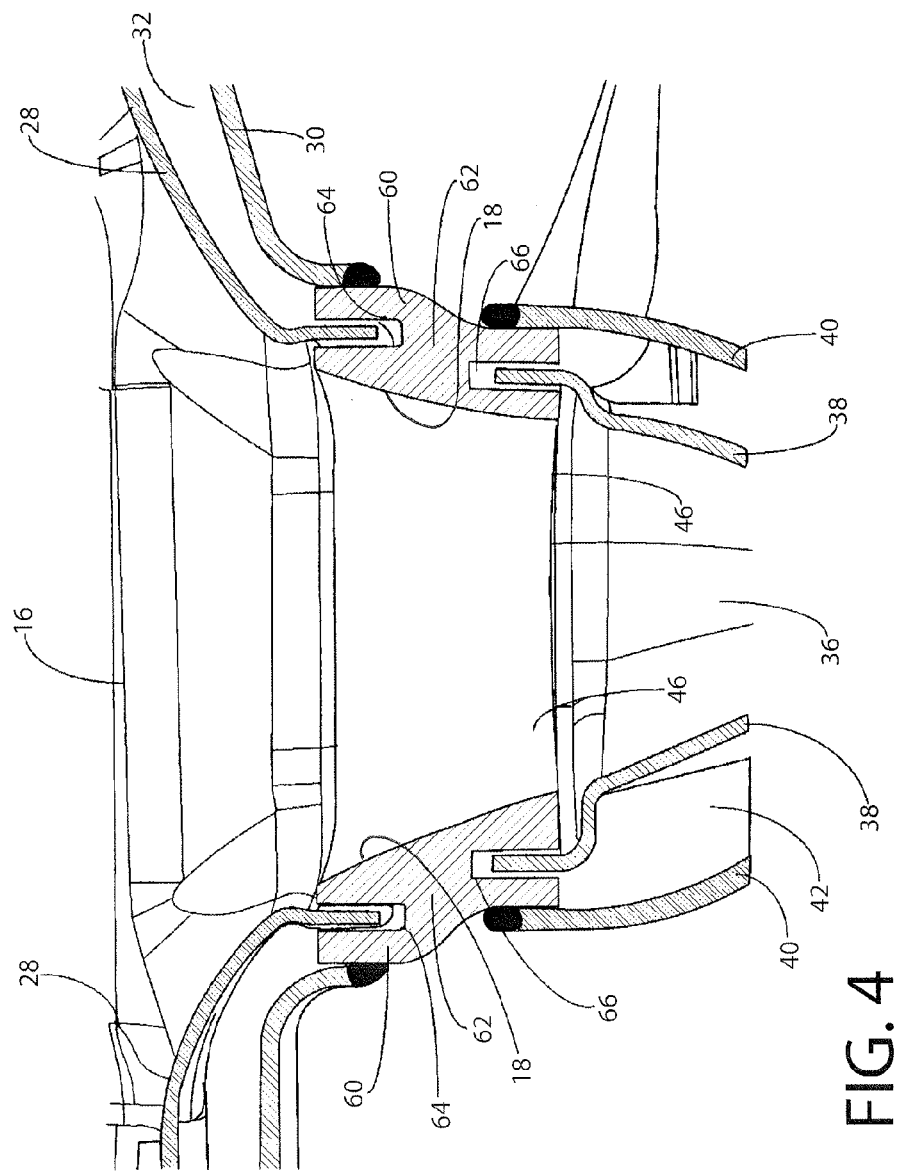
FIG. 4 illustrates a cutaway view of a tapered integration ring connecting an exhaust manifold and turbine housing.

The integration ring 10 may be shaped to alter or manipulate the flow of exhaust between the manifold 12 and the turbine housing 14. For example, as illustrated in FIG. 4, the integration ring 10 may include a tapered interior surface 46 of the inner wall 18. The tapered interior surface 46 may be wider at a first end of the integration ring 10 and narrower at a second end of the integration ring 10. The tapered surface 46 may funnel the exhaust flow to the inlet port 36 of the turbine housing 14. While the integration ring 10 is shown and described as having a tapered interior configuration, it will be appreciated that the inlet ring may have any appropriate interior shape to create the desired flow characteristics.

Notwithstanding the arrangement of the interior surface 46, the first and second pockets 24, 26 may maintain a shape and arrangement to allow for thermal expansion of the inner walls 28, 38. For example, as illustrated in FIG. 4, the first and second pockets 64, 66 may extend parallel to the inner walls 28, 38 to allow for thermal expansion thereof. In an embodiment, the first and second pockets 64, 66 may be arranged parallel to but offset from one another, as shown in FIG. 4. It will be appreciated, however, that the first and second pockets 64, 66 may have any appropriate configuration to provide a slip fit with the inner walls 28, 38 while allowing for sufficient expansion therein.

Figure 5:
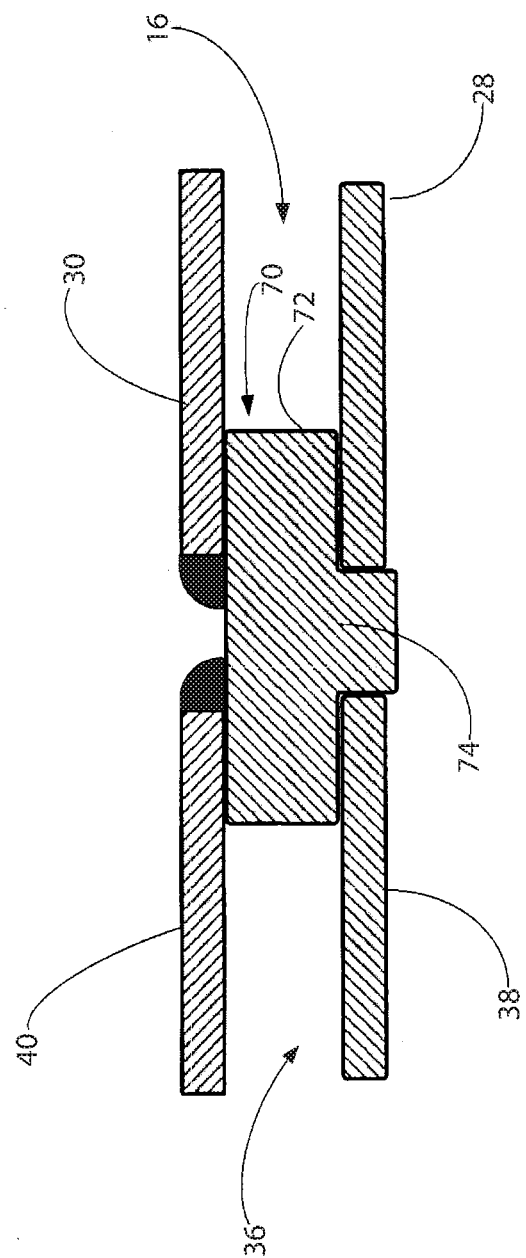
FIG. 5 illustrates a first alternative integration ring configuration.

In an embodiment illustrated in FIG. 5, an integration ring 70 may comprise a single wall configuration, such as a T-shaped configuration. The ring 70 may comprise an outer wall 72 and a spacer 74 connected thereto. The outer wall 72 may be positioned between the inner walls 28, 38 and the outer walls 30, 40 of the manifold outlet port 16 and the housing inlet port 36. The spacer 74 may protrude from the outer wall to fill a portion of the space between the manifold inner wall 28 and the housing inner wall 38. The inner walls 28, 38 may be arranged to move freely with respect to the integration ring 70. The integration ring 70 may be positioned to allow sufficient clearances for thermal expansion of the inner walls 28, 38. The outer walls 30, 40 may be connected directly to an outer surface of the integration ring 70. For example, the outer walls 30, 40 may be welded to the integration ring 70. As shown, the integration ring 70 may maintain a separation between the manifold 12 and housing 14 while interconnecting the two components.

Figure 6:
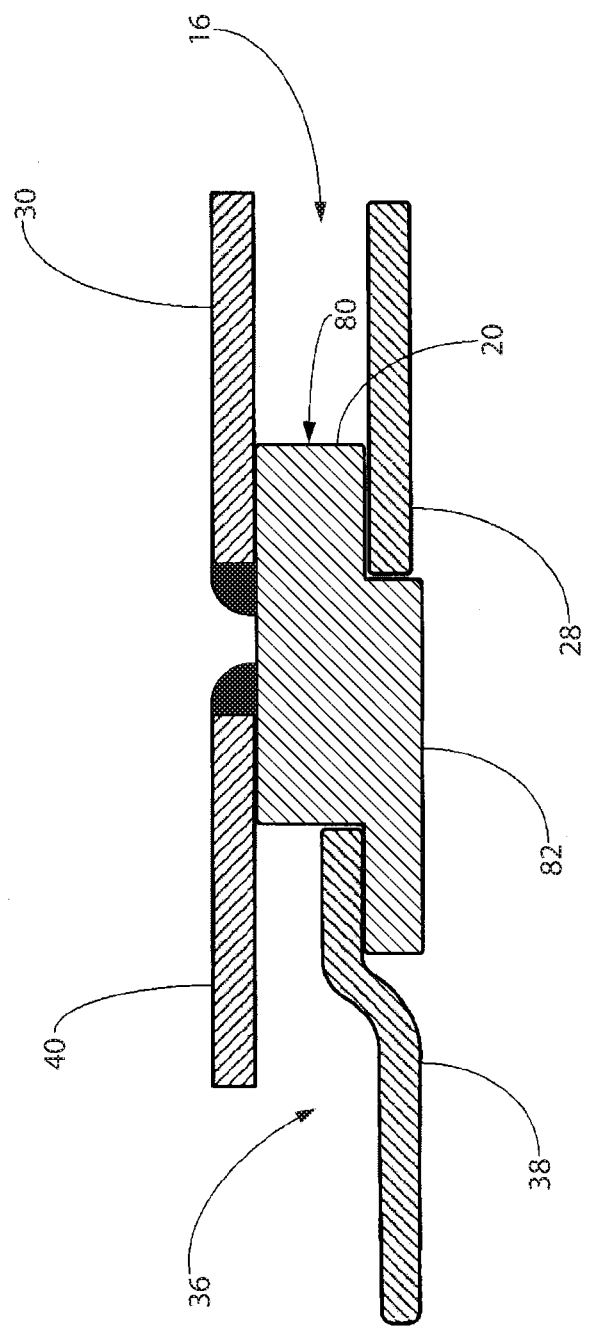
FIG. 6 illustrates a second alternative integration ring configuration.

In an embodiment shown in FIG. 6, an integration ring 80 may comprise an inner wall 18 directly connected to an outer wall 20 without a space therebetween. The inner wall 82 and outer wall 20 may be laterally offset from one another to form an S-shaped configuration. The outer wall 20 may be directly connected, such as welded, to the outer walls 30, 40. The inner walls 28, 38 may be arranged to freely move with respect to the integration ring 80. In particular, the manifold inner wall 28 may be positioned adjacent to the inner surface of the outer wall 20, while the housing inner wall 38 may be positioned about the outer surface of the inner wall 82. It will be appreciated that the arrangement of the housing and manifold may also be reversed. The integration ring 80 may be arranged to provide sufficient clearances for thermal expansion of the inner walls 28, 38.

The invention has been described above and, modifications and alterations will occur to others upon a reading and understanding of this specification. The claims as follows are intended to include all modifications and alterations insofar as they come within the scope of the claims or the equivalent thereof.

The invention claimed is:

1. An integration ring assembly comprising:
an exhaust manifold connected to a vehicle engine to receive gas emissions from the vehicle engine, the exhaust manifold having an outer wall and an inner wall positioned interior to and spaced apart from the outer wall of the exhaust manifold to form an air pocket therebetween;
a turbine housing configured to receive the gas emissions from the exhaust manifold, the turbine housing having an outer wall and an inner wall positioned interior to and spaced apart from the outer wall of the turbine housing to form an air pocket therebetween;
a single piece integration ring comprising:
an integration ring outer wall;

an integration ring inner wall spaced apart from the integration ring outer wall;

a spacer interconnecting the integration ring outer wall and the integration ring inner wall;

a first pocket at a first end of the integration ring comprising a space defined by the integration ring outer wall, the integration ring inner wall, and a first surface of the spacer; and a second pocket at a second end of the integration ring comprising a space defined by the integration ring outer wall, the integration ring inner wall, and a first surface of the spacer wherein, the inner wall of the exhaust manifold is positioned within the first pocket and the outer wall of the exhaust manifold is welded exterior to the outer wall of the integration ring;

wherein, the inner wall of the turbine housing is positioned within the second pocket and the outer wall of the turbine housing is welded exterior to the outer wall of the integration ring;

wherein, when in final assembled position, the distance between the integration ring inner wall and integration ring outer wall that defines the first pocket is greater than the thickness of the portion of the inner wall of the exhaust manifold received therein such that the inner wall of the exhaust manifold moves freely within the first pocket to allow for thermal expansion and contraction of the exhaust manifold; and wherein, when in final assembled position, the distance between the integration ring inner wall and integration ring outer wall that defines the second pocket is greater than the thickness of the portion of the inner wall of the turbine housing received therein such that the inner wall of the turbine housing moves freely within the second pocket to allow for thermal expansion and contraction of the turbine housing.

2. The integration ring assembly of claim 1, wherein the portion of the exhaust manifold includes an inner wall of an outlet port of the exhaust manifold.

3. The integration ring assembly of claim 1, wherein the portion of the turbine housing includes an inner wall of an inlet port of the turbine housing.

4. The integration ring assembly of claim 1, wherein the integration ring has a generally circular cross-sectional shape.

* * * * *